(12) United States Patent
Czuhanich et al.

(10) Patent No.: US 7,282,650 B2
(45) Date of Patent: Oct. 16, 2007

(54) CONDUIT GLAND

(75) Inventors: Michael A. Czuhanich, Vestal, NY (US); John J. Ford, Binghamton, NY (US)

(73) Assignee: Lockheed Martin Corp., Bethesda, MD (US)

( * ) Notice: Subject to any disclaimer, the term of this patent is extended or adjusted under 35 U.S.C. 154(b) by 113 days.

(21) Appl. No.: 11/098,293

(22) Filed: Apr. 4, 2005

(65) Prior Publication Data
US 2006/0082157 A1 Apr. 20, 2006

Related U.S. Application Data

(60) Provisional application No. 60/618,932, filed on Oct. 14, 2004.

(51) Int. Cl.
*H02G 3/18* (2006.01)
(52) U.S. Cl. .................. 174/659; 174/650; 174/655; 16/2.1; 248/56
(58) Field of Classification Search ........ 174/650–669, 174/64, 151, 135; 16/2.1, 2.2; 248/56; 439/604; 277/606
See application file for complete search history.

(56) References Cited

U.S. PATENT DOCUMENTS

| 4,517,408 | A | * | 5/1985 | Pegram .................. 174/153 G |
| 4,721,830 | A | | 1/1988 | Dagan et al. |
| 5,139,441 | A | | 8/1992 | Jonval |
| 5,241,136 | A | * | 8/1993 | Michaelis et al. .......... 174/151 |
| 6,351,592 | B1 | * | 2/2002 | Ehn et al. .................... 385/135 |
| 6,528,726 | B1 | | 3/2003 | Jauch et al. |
| 6,588,712 | B2 | | 7/2003 | Brell et al. |

OTHER PUBLICATIONS

Gleason Reel Corporation Installation Instructions Multi-Cable Gland website, http://www.hubbell-gleason.com/GRPartsFestoons/044976.pdf, visited on Aug. 4, 2005, date can be changed.
Hawke Transit System website, http://www.hawke-hts.com, visited on Aug. 4, 2005, date can be changed.
International Components, Inc. website, http://www.intlcomponents.com/nylon__multi-php, visited on Aug. 4, 2005, date can be changed.
Nelson Fire Stop Products MCT™/MPS™ Engineering Manual website, http://www.nelsonfirestop.com/MCT%20Engineering%20Manual.pdf, visited on Aug. 4, 2005, date can be changed.
Jastram Technologies, Ltd. web-site, http://www.jastramtechnologies.com/bst/bst-index.htm, visited on Aug. 4, 2005, date can be changed.

* cited by examiner

*Primary Examiner*—Dhiru R. Patel
(74) *Attorney, Agent, or Firm*—Michael Best & Friedrich LLP (57) ABSTRACT

A conduit gland that is adapted to engage at least one conduit that passes through an aperture in a housing. The conduit gland includes a bracket adapted to engage the housing; and a resilient member that has a portion retained by the bracket and the housing. The conduit gland also includes a clamp surface that, together with the resilient member, at least partially covers the aperture and engages the conduit.

26 Claims, 8 Drawing Sheets

CONDUIT GLAND

RELATED APPLICATION DATA

This application claims benefit under 35 U.S.C. Section 119(e) of co-pending U.S. Provisional Application No. 60/618,932 filed Oct. 14, 2004, which is fully incorporated herein by reference.

BACKGROUND

The present invention relates generally to a conduit gland. More particularly, the present invention relates to a conduit gland that is able to accommodate a plurality of conduits.

Electrical enclosures generally provide some protection to the electrical components contained therein. Any holes or apertures that are not sealed tend to diminish this protection by providing a path for dust, dirt, or other debris. Thus, conduit connections are generally made using a fixed connector that extends beyond the outer surface of the enclosure. Typically, the interface between the connector and the enclosure establishes a seal that inhibits the entry of unwanted particles.

Often, the electrical components within the enclosure can be connected to various other components (e.g., sensors). However, because the connections may vary from application to application, it may be difficult to provide sealed connectors for all of the various possibilities. Therefore, an aperture is provided in the enclosure to allow for the passage of various conduits. However, the open aperture is not sealed and provides a path for dust to enter the enclosure. In addition, the conduits can be easily pulled from the housing as they are not held in any way other than the connection within the enclosure.

SUMMARY

The present invention provides a conduit gland for an enclosure aperture. The gland allows for the passage of a plurality of conduits and at least partially seals the aperture. Thus, the gland inhibits the entry of dust into the enclosure. In addition, the gland clamps the conduits to provide some strain relief. Thus, removal of the conduit by pulling on the conduit is resisted by the conduit gland.

In one construction, the invention provides a conduit gland that is adapted to engage at least one conduit that passes through an aperture in a housing. The conduit gland includes a bracket adapted to engage the housing; and a resilient member that has a portion retained by the bracket and the housing. The conduit gland also includes a clamp surface that, together with the resilient member, at least partially covers the aperture and engages the conduit.

In another construction, the invention provides a conduit gland that is adapted to engage at least one conduit that passes through an aperture in a housing. The conduit gland includes a first bracket adapted to engage the housing on a first side of the aperture and a first resilient member that includes a portion retained by the first bracket and the housing. A second bracket is adapted to engage the housing on a second side of the aperture opposite the first side and a second resilient member cooperates with the first resilient member to engage the conduit. The second bracket and the housing retain a portion of the second resilient member.

In yet another construction, the invention provides a conduit gland that is adapted to engage a plurality of conduits. Each conduit passes through at least one of a first aperture and a second aperture in a housing. The conduit gland includes a bracket that has a first leg and a second leg. The bracket is coupled to the housing and is disposed between the first aperture and the second aperture. A first resilient member is coupled to the first leg and is disposed adjacent the first opening. A second resilient member is coupled to the second leg and is disposed adjacent the second opening. A first clamp member cooperates with the first resilient member to at least partially cover the first aperture and to engage any of the plurality of conduits that pass through the first aperture. A second clamp member cooperates with the second resilient member to at least partially cover the second aperture and to engage any of the plurality of conduits that pass through the second aperture.

Additional features and advantages will become apparent to those skilled in the art upon consideration of the following detailed description exemplifying the best mode of carrying out the invention as presently perceived.

BRIEF DESCRIPTION OF THE DRAWINGS

The detailed description particularly refers to the accompanying figures in which.

DETAILED DESCRIPTION

Figure 1:
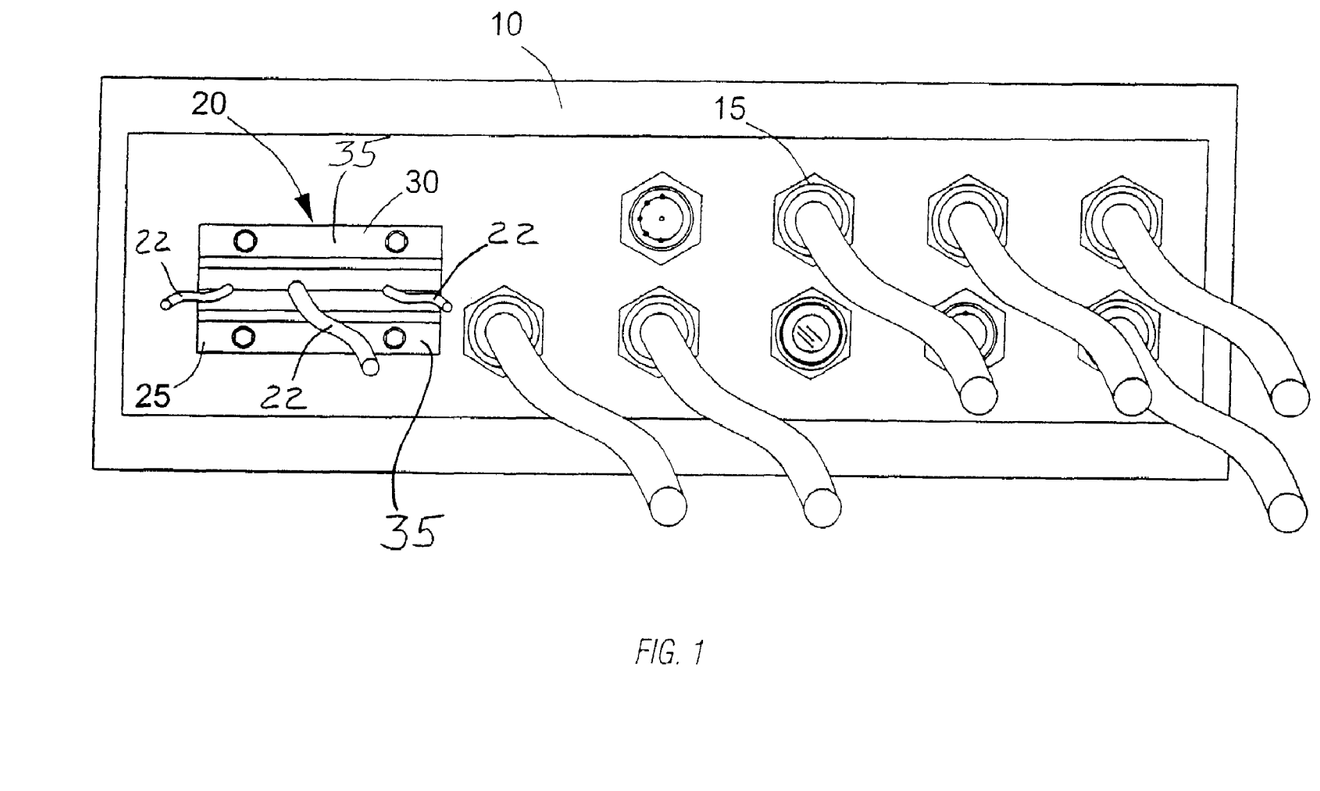
FIG. 1 is a rear view of an enclosure including a conduit gland.

With reference to FIG. 1, the rear portion of an enclosure 10 or housing such as a computer enclosure or an electrical equipment enclosure is illustrated. The enclosure 10 includes a plurality of conduit connection points 15 that are each adapted to receive a particular conduit. Before proceeding, the term "conduit" as used herein is meant to refer to any member that may pass through a housing. For example, a tube that transmits a pressurized fluid to a pressure sensor within the housing is a conduit. In addition, wires and cables that transmit electrical, optical, magnetic, or other signals are also "conduits" as that term is defined.

The rear portion of the enclosure 10 also includes an entry aperture 17 and a conduit gland 20 at least partially surrounding the aperture. As shown in FIG. 1, the conduit gland 20 clamps a conduit 22 or conduits 22 that pass through the aperture and provides some strain relief for these conduits 22. Thus, if a conduit 22 is pulled, the gland clamp 20 resists the pull but still allows the conduit 22 to move slightly if the force is significant. The conduit gland 20 also at least partially seals the aperture 17 to inhibit the entry of dust, dirt, or other debris that could be harmful to the components enclosed within the enclosure 10. FIG. 1 shows three conduits 22 entering the enclosure 10 via the conduit gland 20. Of course, more or fewer conduits 22 can enter the enclosure 10 if desired. For example, one construction facilitates the passage of over thirty different conduits 22, while still maintaining a substantial seal.

Figure 13:
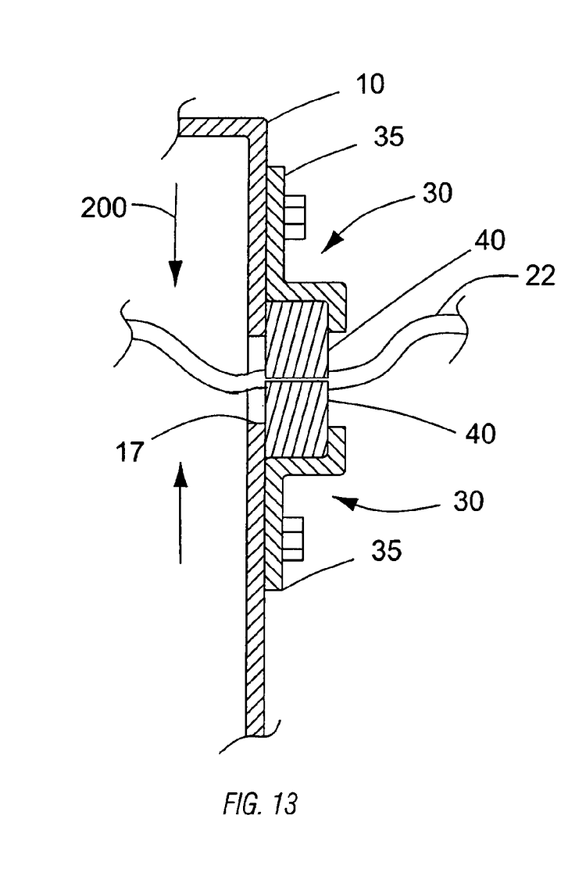
FIG. 13 is a section view of the enclosure and conduit gland of FIG. 1 taken along a line normal to the long axis of the conduit gland.
Figure 14:
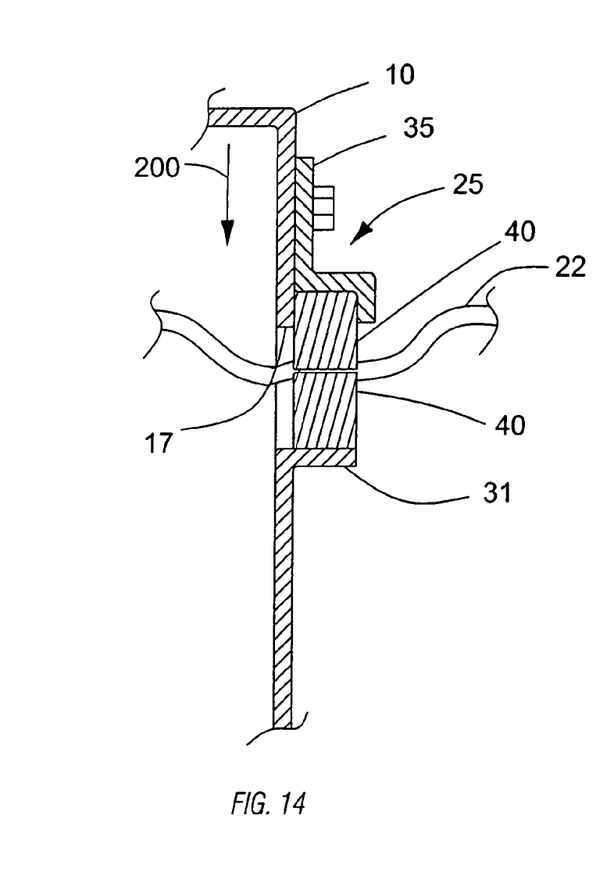
FIG. 14 is a section view of another enclosure and conduit gland taken along a line normal to the long axis of the conduit gland.

The conduit gland 20 includes a first jaw portion 25 and a second jaw portion 30. In most constructions, the two jaw portions 25, 30 are substantially similar to one another with one jaw portion 30 rotated 180 degrees relative to the other jaw portion 25 as shown in FIG. 13. In other constructions, one jaw portion 25 is disposed opposite a flat plate 31 as shown in FIG. 14. The plate 31 can attach to the enclosure 10 or can be formed as part of the enclosure 10.

Figure 2:
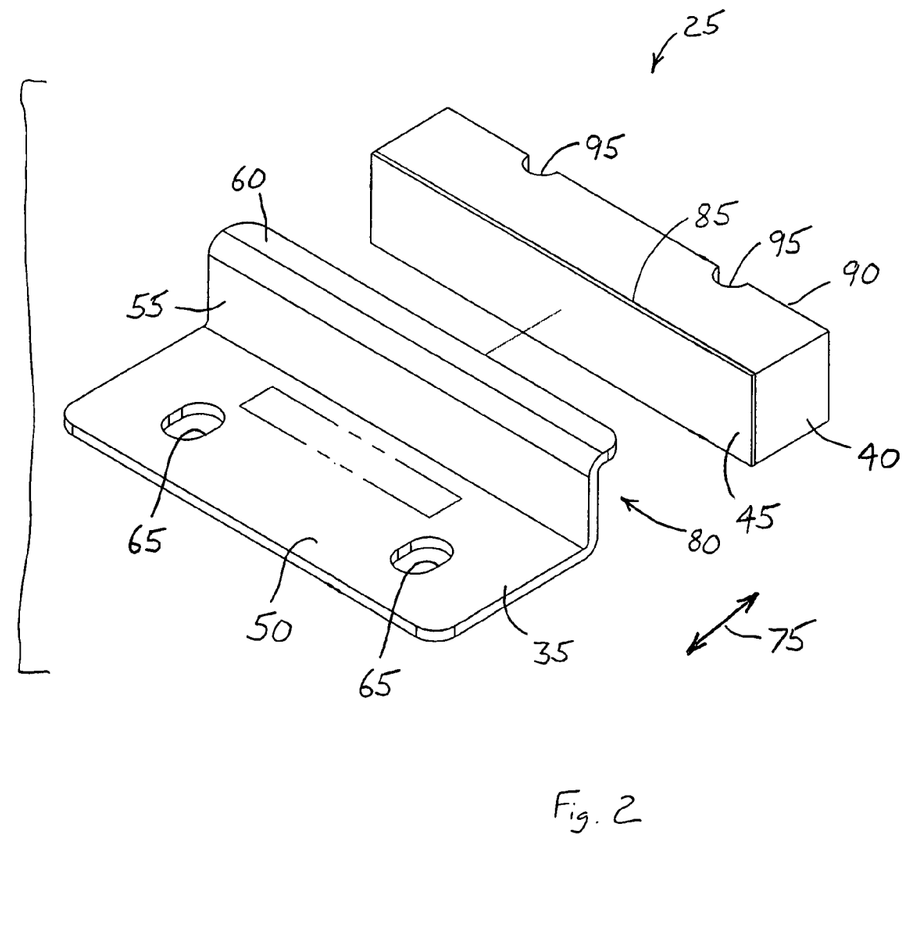
FIG. 2 is an exploded perspective view of a jaw portion of the conduit gland of FIG. 1.
Figure 3:
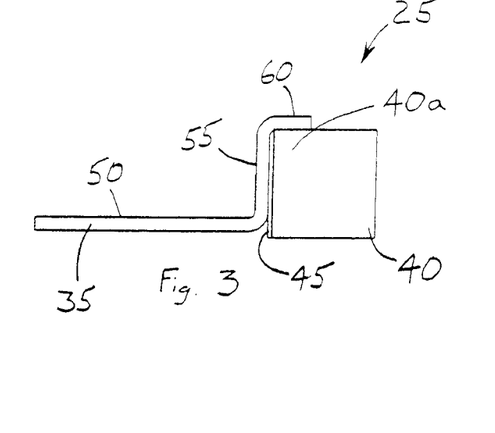
FIG. 3 is an end view of the jaw portion of FIG. 1.
Figure 4:
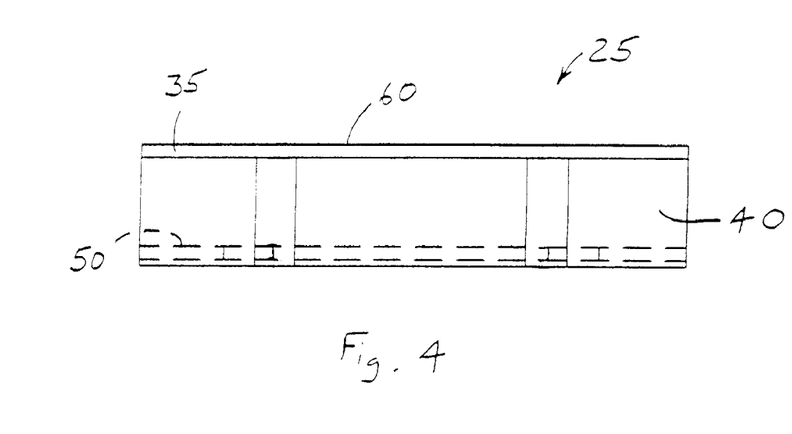
FIG. 4 is a bottom view of the jaw portion of FIG. 2.

FIGS. 2-4 illustrate one of the first jaw portions 25. The jaw portion 25 includes a bracket 35 and a resilient clamp 40 (sometimes referred to herein as resilient member, clamp, or resilient clamp member) attached to the bracket 35. In most constructions, an adhesive backing 45 is applied to a surface of the clamp 40 such that the clamp 40 can be adhesively bonded to the bracket 35. In other constructions, glue or adhesive is applied to the bracket 35 or to both the bracket 35 and the clamp 40. In still other constructions, no fastening means are used or other fastening means (e.g., screws, hooks, VELCRO, and the like) are used to attach the clamp 40 to the bracket 35.

The bracket 35, illustrated in FIGS. 2-4 and 8-9, includes a first surface 50, a second surface 55 that is substantially perpendicular to the first surface 50, and a third surface 60 that is substantially parallel to the first surface 50. The first surface 50 engages the enclosure 10 and facilitates the attachment of the jaw portion 25. Two slots 65 or elongated apertures are formed in the first surface 50 and are sized to receive a fastener 70 such as a screw. The slots 65 are oriented to allow movement of the jaw portion 25 in a direction 75 that is normal to the second surface 55. Movement in this direction 75 allows for the increase or reduction in the distance between the two jaw portions 25, 30.

Other constructions of the bracket 35 vary the orientation of the first surface 50, the second surface 55, and the third surface 60 relative to one another. There is no requirement that the second surface 55 be perpendicular to the first surface 50. Similarly, there is no requirement that the third surface 60 be parallel to the first surface 50 as other orientations are also possible. In addition, other constructions may include jaw portions 25 that move in directions that are not normal to the second surface 55.

The second surface 55 extends from the end of the first surface 50 and the third surface 60 extends from the end of the second surface 55. The second surface 55 cooperates with the third surface 60 to at least partially define a clamp space 80. The clamp 40, when attached to the bracket 35, is at least partially disposed within the clamp space 80 (see clamp portion 40a in FIG. 3). The second surface 55 is sized such that it cooperates with the surface of the enclosure 10 to define a width that is substantially equal to, or slightly smaller than, a width of the clamp 40. Thus, when the bracket 35 is positioned in its operating position, at least a portion of the clamp 40 is retained by the enclosure 10 and the third surface 60. In most constructions, the clamp 40 is sandwiched and compressed between the enclosure 10 and the third surface 60.

In most constructions, a single piece of bent steel is employed to form the bracket 35. Of course, other materials (e.g., aluminum, plastic, composite, ceramic, and the like) could be employed to form the bracket 35. The manufacturing process used should be based on the material being employed. For example, in constructions in which a plastic bracket is employed, injection molding may be a more suitable manufacturing process.

Turning to FIGS. 2-7 the resilient clamp member 40 is illustrated. The resilient clamp member 40 includes an elongated portion that includes a first surface 85 and a second surface 90. The adhesive backing 45 is attached to the first rectangular surface 85 to facilitate the attachment of the clamp member 40 to the bracket 35. The second rectangular surface 90 is disposed opposite the first rectangular surface 85 and interfaces with the conduits that pass through the conduit gland 20 and with the resilient clamp member 40 disposed within the opposite bracket 35. As such, the second surface 90 is a clamp surface. In should be noted that the arrangement of the aperture 17 largely dictates the shape of the resilient clamp member 40. Thus, for an elongated aperture, an elongated resilient member 40 is a good choice. However, other shaped apertures may dictate other shapes for the resilient members.

Figure 5:
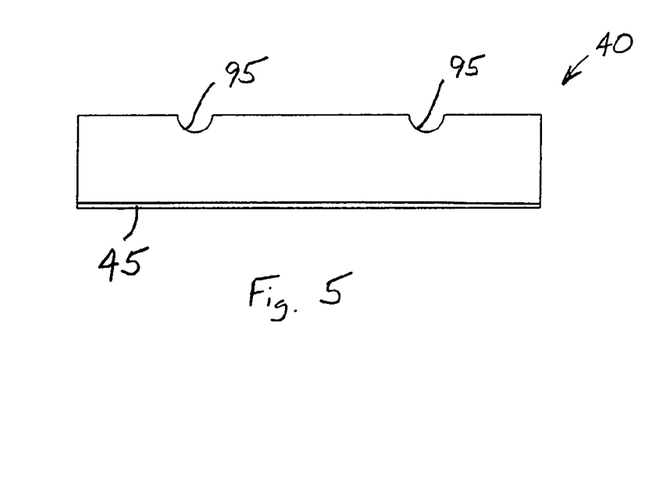
FIG. 5 is a front view of a resilient clamp member of the jaw portion of FIG. 2.
Figure 6:
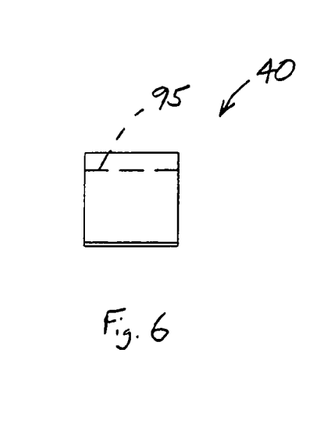
FIG. 6 is an end view of the resilient clamp member of FIG. 5.
Figure 7:
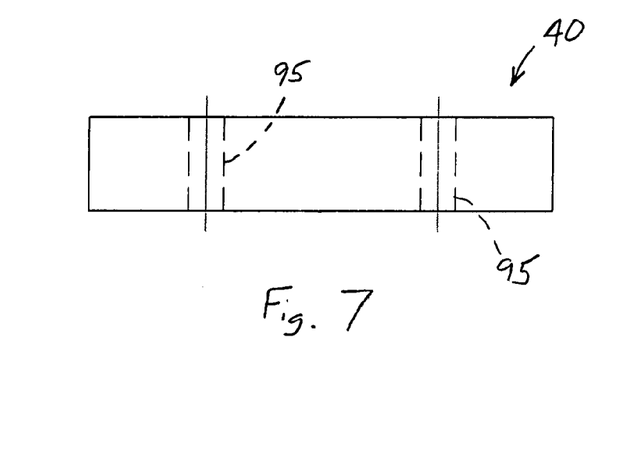
FIG. 7 is a top view of a resilient clamp member of FIG. 5.
Figure 8:
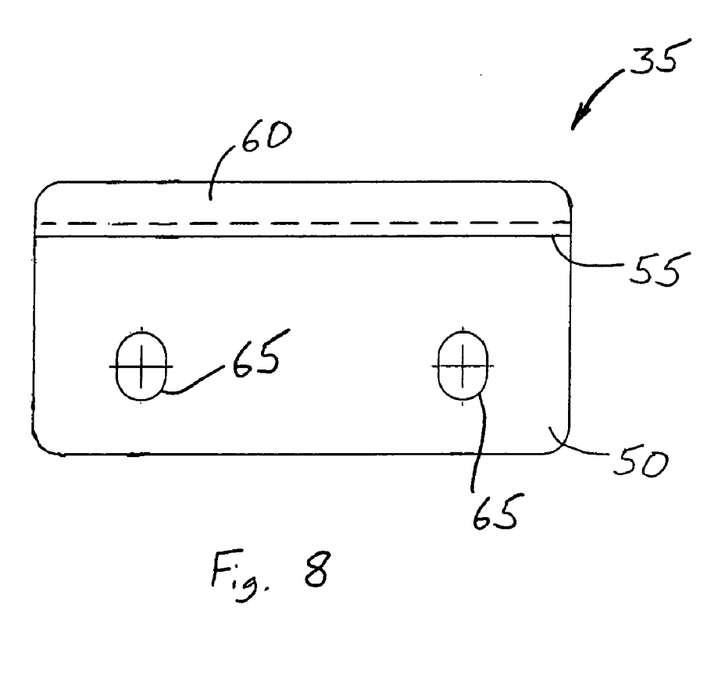
FIG. 8 is a front view of a bracket of the jaw portion of FIG. 2.
Figure 9:
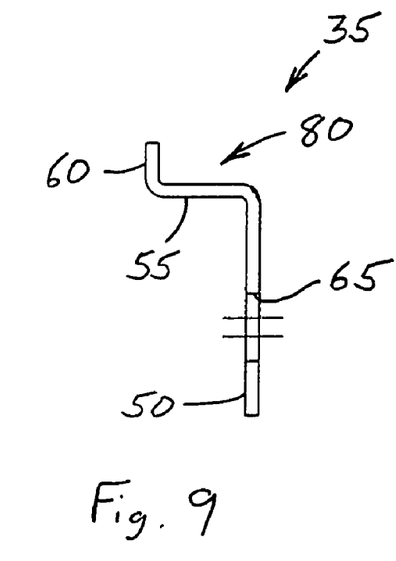
FIG. 9 is an end view of the bracket of FIG. 8.

As is best illustrated in FIG. 5, the second rectangular surface 90 includes one or more recesses 95 formed with the resilient clamp member 40 or using any suitable means (e.g., cutting, boring, drilling, punching, etc.). The recesses 95 receive a conduit 22 that passes through the conduit gland 20 to improve the seal between the resilient clamp member 40 and the conduit 22. As illustrated in FIG. 5, the recesses 95 are semi-circular. However, other constructions employ scallops or recesses 95 that are not semi-circular. It is not necessary that the recesses 95 be sized for a particular conduit 22, nor is it necessary that the recesses 95 be semi-circular, as the resilient clamp 40 will accommodate differences in size and will compress to achieve a seal. The recesses 95 simply reduce the likelihood of an inadequate seal. If a single jaw portion 25 is used, recesses 95 may be punched or drilled in the jaw portion 25 to receive the conduits 22.

While the figures illustrate only two recesses 95, clamp members 40 having more than two recesses 95 are possible. For example, one construction includes thirty recesses 95 that can accommodate up to thirty conduits 22. Other constructions may include even more than thirty recesses 95 if desired.

Figure 10:
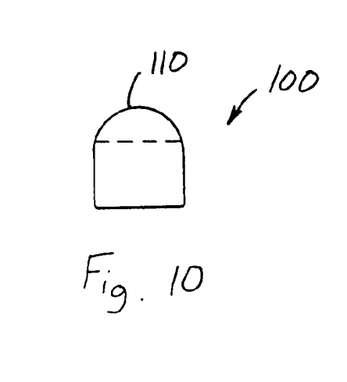
FIG. 10 is an end view of another resilient clamp member.

FIGS. 2-7 illustrate a resilient clamp member 40 that has a cross-section (shown in FIG. 6) that is substantially square. Other constructions may vary this cross-section to achieve a better seal. For example, FIG. 10 illustrates another clamp member 100 that has a cross-section that includes a semi-circular portion 105 on top of a rectangular portion. Recesses 95 still extend across the semi-circular portion 105 as was described with regard to FIGS. 2-9. However, the semi-circular portion 105 reduces the contact area between adjacent resilient clamp members as they engage one another. As the jaw portions 25, 30 are moved closer to one another, all of the force is focused on the smaller contact area, thus increasing the contact pressure. In addition, as the resistant clamps 100 compress, additional contact area is established and the contact pressure is distributed.

To use the conduit gland 20, the first jaw portion 25 is positioned adjacent the second jaw portion 30. While the first jaw portion 25 can be positioned above or below the aperture 17, it is preferred that it be positioned below the aperture 17. Conduits 22 are arranged such that one end is disposed within the enclosure 10 and the conduit 22 extends out the enclosure aperture 17. The conduits 22 are positioned in recesses 95 formed in the first jaw portion 25. The second jaw portion 30 is positioned adjacent the enclosure aperture 17 opposite the first jaw portion 25. The second jaw portion 30 is moved toward the first jaw portion 25 such that the conduits 22 fit within recesses 95 formed in the second jaw portion 30, and the resilient clamp members 40 of the first jaw portion 25 and the second jaw portion 30 contact one another. The second jaw portion 30, and the first jaw portion 25 if necessary, are moved still closer to one another to compress the resilient clamp members 40 and preferably achieve a seal. The screws 70 that hold the first jaw portion 25 and the second jaw portion 30 against the enclosure 10 are tightened such that the third planar portions 60 of the brackets 35 can clamp and compress the resilient clamp portion 40 between the bracket 35 and the enclosure surface. With the screws 70 tight, the resilient clamp members 40 cooperate to substantially seal the enclosure aperture 17. In addition, the resilient clamp members 40 frictionally engage the conduits 22 to produce resistance to conduit extraction. Any recesses 95 that do not include a conduit 22 are preferably compressed sufficiently to establish a seal. Thus, a resilient clamp member 40 with thirty recesses 95 can be employed to seal the aperture 17 even if fewer than thirty conduits 22 are employed.

Figure 11:
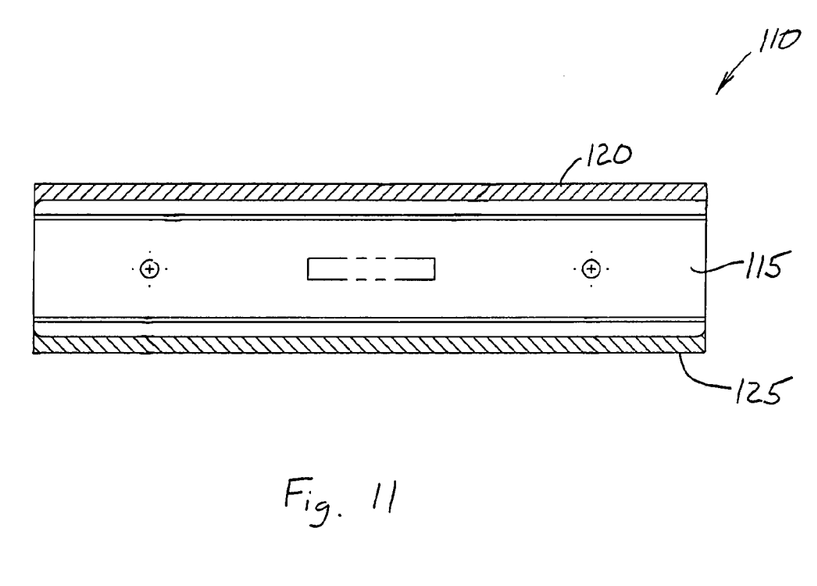
FIG. 11 is a front view of a central jaw portion.
Figure 12:
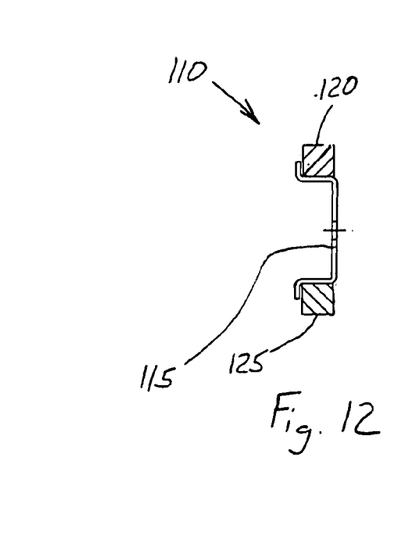
FIG. 12 is an end view of the central jaw portion of FIG. 11.
Figure 15:
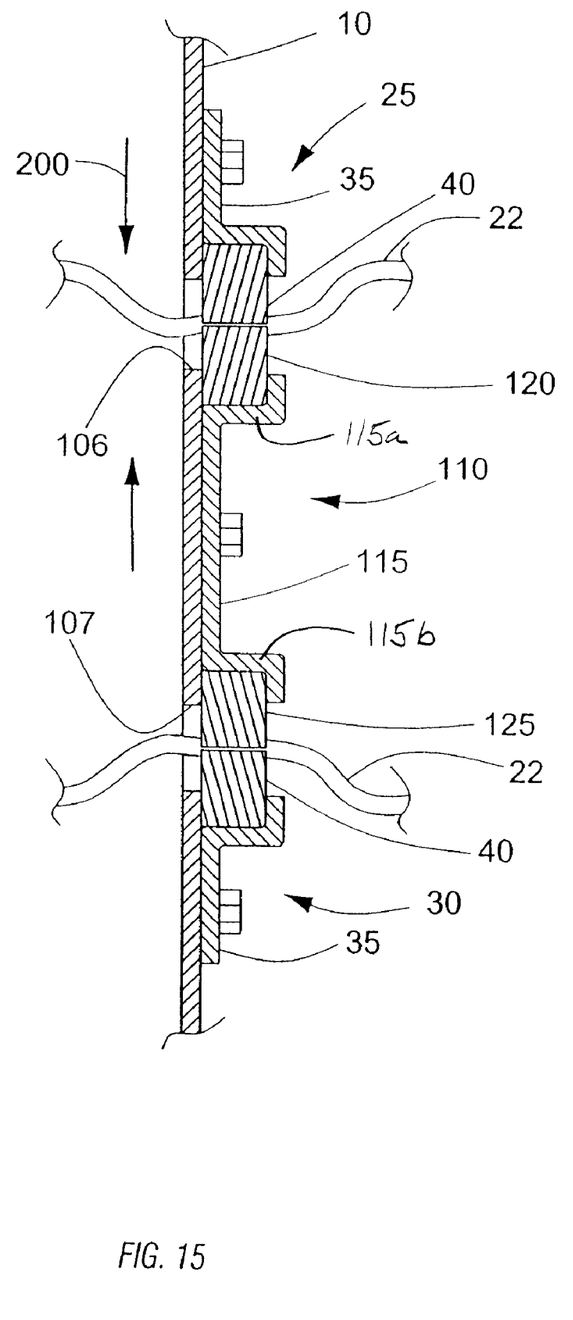
FIG. 15 is a section view of another enclosure including two apertures and a conduit gland taken along a line normal to the long axis of the conduit gland.

In another construction, illustrated in FIG. 15, two substantially parallel apertures 106, 107 are provided in the enclosure 10. The use of two apertures 106, 107 allows for the distribution of the various conduits 22 across a greater space, and/or allows for the passage of a greater number of conduits 22. A central jaw portion 110, shown in FIGS. 11, 12, and 15 is positioned between the apertures 106, 107 and fixedly attached to the enclosure 10. The central jaw 110 includes a bracket 115 having a first leg 115a and a second leg 115b, and two resilient clamp members 120, 125. One resilient clamp member 120 is disposed adjacent one side of the first aperture 106, when the bracket 115 is attached to the enclosure 10, and the second resilient clamp 125 is disposed adjacent the second aperture 107. A first jaw portion 25 is disposed adjacent the first aperture 106 opposite the first resilient clamp 120 of the central jaw portion 110, and a second jaw portion 30 is disposed adjacent the second aperture 107 opposite the second resilient clamp 125 of the central jaw portion 110.

In use, the conduits 22 are positioned in the apertures 106, 107 as was described with regard to FIGS. 1-10 and the first jaw portion 25 and the second jaw portion 30 are positioned. The first jaw portion 25 moves in a first direction 200 to clamp the conduits 22 in the first aperture 106 and to at least partially seal the first aperture 106. The second jaw portion 30 moves in a second direction 205, substantially opposite the first direction 200, to clamp the conduits 22 that pass through the second aperture 107 and to at least partially seal the second aperture 107. The central jaw portion 110 remains substantially fixed, as movement toward the first aperture 106 would also produce undesirable movement away from the second aperture 107.

While many material choices are available for the resilient clamp members 40, 120, 125, the material used is preferably resilient enough to establish a seal. One material that is suitable for use is an adhesive-backed neoprene. A neoprene having the following properties is well suited for use with the invention described herein:

Firmness Rating 4 to 5;
Tensile Strength, 50 psi;
Percent Elongation 150 percent;
Compression (25 percent Deflection), 5 to 9 psi; and
Density of 6 to 11 lbs. per cu. ft.

Of course, other materials may also function with the invention.

Although the invention has been described in detail with reference to certain preferred embodiments, variations and modifications exist within the scope and spirit of the invention as described and defined in the following claims.

What is claimed is:

1. A conduit gland adapted to engage at least one conduit passing through an aperture in a housing, the conduit gland comprising:
   a bracket adapted to engage the housing, the bracket including a substantially planar portion;
   a resilient member positioned to at least partially cover the aperture and having a portion retained between the substantially planar portion of the bracket and the housing; and
   a clamp surface separate from the bracket that, together with the resilient member, engages the conduit.

2. The conduit gland of claim 1, wherein at least one of the bracket and the clamp surface is movable toward the other of the bracket and the clamp surface.

3. The conduit gland of claim 1, wherein the resilient member includes a first recess sized to at least partially receive the conduit.

4. The conduit gland of claim 3, wherein the clamp surface includes a second recess that cooperates with the first recess to receive the conduit.

5. The conduit gland of claim 1, wherein the clamp surface includes a second resilient member.

6. The conduit gland of claim 5, wherein the first resilient member and the second resilient member cooperate to substantially seal the aperture.

7. The conduit gland of claim 5, further comprising a second bracket coupled to the housing such that at least a portion of the second resilient member is retained by the second bracket and the housing.

8. The conduit gland of claim 1, wherein the bracket includes an elongated aperture sized to receive a fastener, the elongated aperture facilitating movement of the bracket toward the clamp surface.

9. The conduit gland of claim 1, wherein the clamp surface includes a substantially flat plate.

10. The conduit gland of claim 9, wherein the substantially flat plate is formed as part of the housing.

11. A conduit gland adapted to engage at least one conduit passing through an aperture in a housing, the conduit gland comprising:
    a first bracket adapted to engage the housing on a first side of the aperture;
    a first resilient member including a portion retained by the first bracket and the housing;
    a second bracket adapted to engage the housing on a second side of the aperture opposite the first side; and
    a second resilient member cooperating with the first resilient member to engage the conduit, a portion of the second resilient member retained by the second bracket and the housing.

12. The conduit gland of claim 11, wherein the first resilient member includes an adhesive that fixedly attaches the first resilient member to the first bracket and the second resilient member includes an adhesive that fixedly attaches the second resilient member to the second bracket.

13. The conduit gland of claim 11, wherein at least one of the first bracket and the second bracket is movable toward the other of the first bracket and the second bracket.

14. The conduit gland of claim 11, wherein the first resilient member includes at least one recess sized to at least partially receive the at least one conduit.

15. The conduit gland of claim 14, wherein the second resilient member includes at least one recess that cooperates with the at least one recess of the first resilient member to receive the at least one conduit.

16. The conduit gland of claim 11, wherein the first bracket includes an elongated aperture sized to receive a fastener, the elongated aperture facilitating movement of the first bracket toward the second resilient member.

17. The conduit gland of claim 16, wherein the second bracket includes a second elongated aperture sized to receive a second fastener, the second elongated aperture facilitating movement of the second bracket toward the first resilient member.

18. The conduit gland of claim 11, wherein the first resilient member and the second resilient member cooperate to substantially seal the aperture.

19. The conduit gland of claim 11, wherein the first bracket includes a substantially planar portion, and wherein the portion of the resilient member retained by the first bracket is retained between the substantially planar portion of the first bracket and the housing.

20. A conduit gland adapted to engage a plurality of conduits, each conduit passing through at least one of a first aperture and a second aperture in a housing, the conduit gland comprising:
  a bracket including a first leg and a second leg, the bracket coupled to the housing and disposed between the first aperture and the second aperture;
  a first resilient member coupled to the first leg and disposed adjacent the first opening;
  a second resilient member coupled to the second leg and disposed adjacent the second opening;
  a first clamp member cooperating with the first resilient member to at least partially cover the first aperture and to engage any of the plurality of conduits that pass through the first aperture; and
  a second clamp member cooperating with the second resilient member to at least partially cover the second aperture and to engage any of the plurality of conduits that pass through the second aperture.

21. The conduit gland of claim 20, wherein the first clamp member is movable toward the bracket to engage the conduits that pass through the first aperture.

22. The conduit gland of claim 21, wherein the second clamp member is movable toward the bracket independent of the first clamp member to engage the conduits that pass through the second aperture.

23. The conduit gland of claim 22, wherein the first clamp member includes a second bracket and a third resilient member, the third resilient member cooperating with the first resilient member to substantially seal the first aperture and to engage any conduits that pass though the first aperture.

24. The conduit gland of claim 23, wherein the first resilient member and the third resilient member cooperate to define a recess adapted to receive at least one of the plurality of conduits.

25. The conduit gland of claim 23, wherein the second clamp member includes a third bracket and a fourth resilient member, the fourth resilient member cooperating with the second resilient member to substantially seal the second aperture and to engage any conduits that pass though the second aperture.

26. The conduit gland of claim 25, wherein the second resilient member and the fourth resilient member cooperate to define a recess adapted to receive at least one of the plurality of conduits.

* * * * *